United States Patent [19]
Yoneyama

[11] Patent Number: 5,500,101
[45] Date of Patent: Mar. 19, 1996

[54] METHOD OF ETCHING ALUMINUM FOIL FOR ELECTROLYTIC CAPACITOR

[75] Inventor: Yoshio Yoneyama, Yamanashi, Japan

[73] Assignee: Nihon Chikudenki Kogyo Kabushiki Kaisha, Tokyo, Japan

[21] Appl. No.: 353,424

[22] Filed: Dec. 9, 1994

[30] Foreign Application Priority Data

Dec. 28, 1993 [JP] Japan ................... 5-348929

[51] Int. Cl.$^6$ ................... C25F 3/04
[52] U.S. Cl. ................... 205/646; 204/DIG. 9; 205/658; 205/674; 205/682; 205/685
[58] Field of Search ................... 204/129.43, DIG. 9, 204/129.4, 129.75

[56] References Cited

U.S. PATENT DOCUMENTS

| | | | |
|---|---|---|---|
| 4,294,672 | 10/1981 | Ohba | 204/129.4 |
| 4,545,875 | 10/1985 | Riley | 204/129.4 |
| 4,681,672 | 7/1987 | Kojima | 204/129.4 |

FOREIGN PATENT DOCUMENTS 985024  3/1965  United Kingdom .

*Primary Examiner*—John Niebling
*Assistant Examiner*—Brendan Mee
*Attorney, Agent, or Firm*—Jordan and Hamburg

[57] ABSTRACT

The present invention relates to a method of etching aluminum foil for electrolytic capacitors that is improved in etching efficiency, wherein when the aluminum foil is etched by applying alternating current in an electrolytic solution containing chloride ions and the like, the alternating current contains, during the positive half period and the negative half period, two half waves having different waveforms, amplitudes, and applied times, and a rest period between the half waves with the amplitude being 0 or with microcurrent being applied on the positive side or the negative side at at most $\frac{1}{15}$ of the maximum amplitude during a half period.

8 Claims, 4 Drawing Sheets

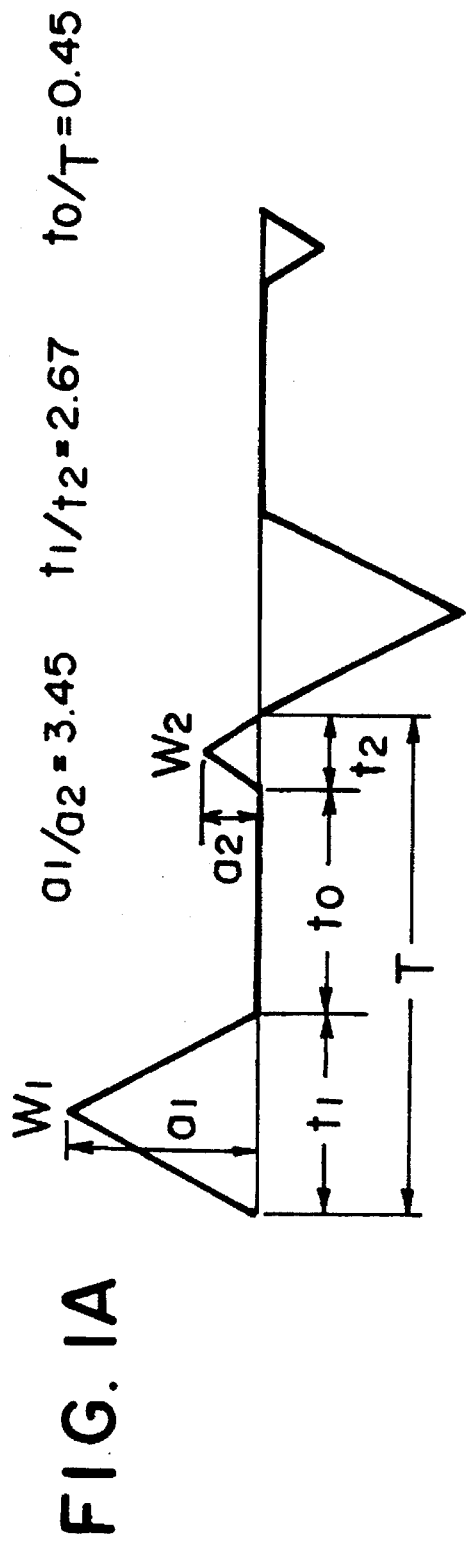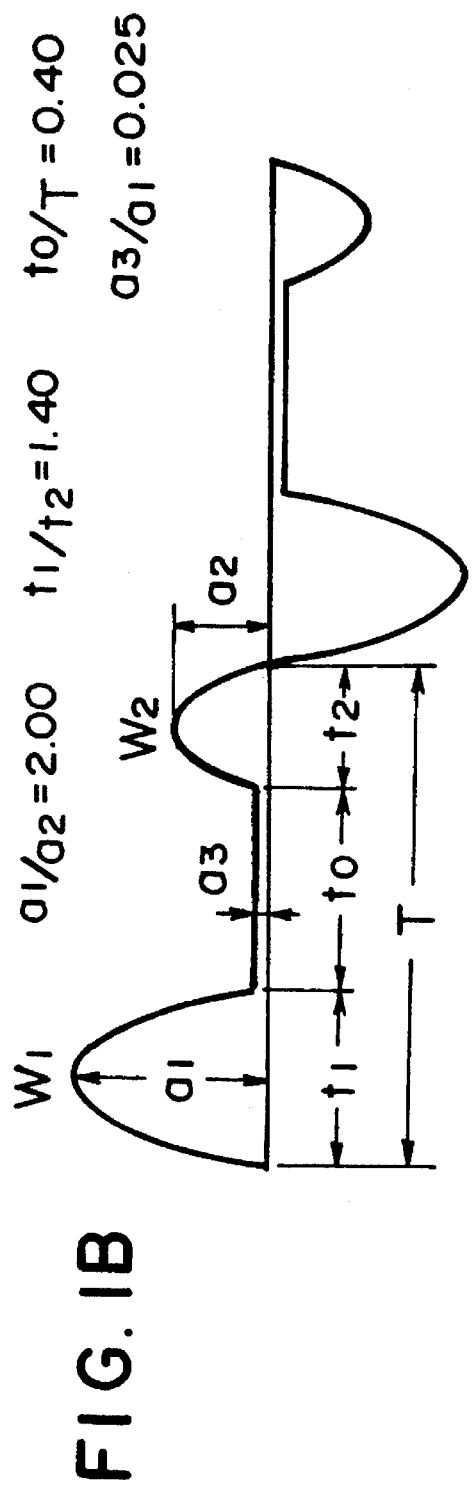

METHOD OF ETCHING ALUMINUM FOIL FOR ELECTROLYTIC CAPACITOR

FIELD OF THE INVENTION

The present invention relates to a method of etching aluminum foil for electrolytic capacitors that is improved in etching efficiency.

DESCRIPTION OF THE PRIOR ART

Conventionally, in the production of aluminum foil for electrolytic capacitors, electrolytic etching is carried out to increase its effective surface area. The supply electric current used for this electrolytic etching includes direct current and alternating current. Particularly, alternating current is widely used in etching cathode foil and anode foil for low voltage because finely etched pits can be obtained.

To make the size of an electrolytic capacitors small, it is required to increase the effective surface gain of etched foil. To realize this, the composition of etching solutions has been contrived and improved. On the other hand, a technique is also used wherein the alternating current supply to be used is changed in frequency or waveform to have, for example, a sine wave, a square wave, a triangular wave, a trapezoidal wave, or a distorted wave.

There are also developed: an etching method wherein the current density or the applied time of the positive side half period and the negative side half period of the alternating current to be applied is changed; and an etching method wherein the etching is carried out in two steps, that is, in the first step, etching is carried out using direct current, and in the second step, etching is carried out using alternating current. However, these methods have the following defects. In the former case, the electric current waveforms of the positive side and the negative side become unsymmetrical and therefore the indirect electricity introduction method wherein an electric current is applied with aluminum foil placed between the two electrodes, which is an advantage of the alternating current etching method, cannot be carried out. Therefore, electricity has to be directly introduced from aluminum foil. In the latter case, the etching facilities have to be divided into two.

Thus, owing to the contrivance and improvement of the etching method by alternating current, the effective surface gain has been improved and the production of high-capacity etched foil has become possible. On the other hand, the mechanical strength of etched foil, such as tensile strength and bending strength is lowered, and when etched foil is subjected to formation, the foil becomes brittle and is liable to be broken. As a result, this becomes disadvantageous when the foil is rolled into a capacitor element.

However, the demand that the size of capacitors is to be made small is increased these days and it is further required that etched foil is increased in capacitance. Therefore, the effective surface gain of etched foil has to be increased without lowering the mechanical strength of the etched foil. However, this is a difficult problem having a contradictory relation between properties, which is to be solved at a time.

SUMMARY OF THE INVENTION

An object of the present invention is to provide an etching method that can improve the capacitance per etching weight loss (etching efficiency) to increase the effective surface gain without lowering the mechanical strength of etched foil.

As one method of solving the problem shown in the above prior art, there is a method wherein the etching efficiency is increased. That is, in the case of foils high in etching efficiency, even an etched foil having the same capacitance becomes a foil high in mechanical strength since the etching weight loss is small and a large amount of the core part remains unetched. Further, in the case wherein the etching weight loss is the same and the mechanical strength is similar, an etched foil high in etching efficiency becomes a foil high in capacitance.

The present inventor takes notice of the pit formation mechanism of the start, extension, and enlargement of pits that occur during the positive side half period of etching by alternating current and thinks that stages of the growth of pits take place in individual time ranges during the positive side half period. As a result, as shown in FIG. 1, there are provided, during a half period, two half waves having the same amplitude or different amplitudes and a rest period between the two half waves on the positive side or the negative side wherein an amplitude of 0 or 9 microcurrent that is $1/15$ or less of the maximum amplitude during a half period is applied. Then when etching is carried out by alternating current with the ratio of the time of the rest period to the time of the half period in the range of 0.18 to 0.85, it has been found that the etching efficiency is increased compared with the prior art etching that is carried out by using a single waveform. When etching is carried out by alternating current with the ratio of the amplitude of the first half wave $a_1$ to the amplitude of the second half wave $a_2$) in the range of 0.4 to 4.0, fine pits are formed highly densely that are suitable for cathode foil and 5 V formation to 140 V formation. It has also been found that corrosion useless for the pit formation becomes less and a foil high in etching efficiency can be produced. When $a_1/a_2$ is greater than 4.0, although fine pits suitable for formation at a low voltage are formed, the etching efficiency is lowered. When $a_1/a_2$ is smaller than 0.4, although large pits suitable for formation at a high voltage are formed, the etching efficiency is also lowered a little. From the above, it can be understood that the start and extension of pits take place highly densely by the first half wave $W_1$ and the pits formed by the first wave $W_1$ are enlarged by the second half wave $W_2$.

Then, from the fact that when the rest period ratio $t_0/T$ between the two half waves is beyond the range of 0.18 to 0.85, the etching efficiency is lowered, and that when a suitable rest period is provided, the etching efficiency is improved, it can be understood that during the rest period a film is formed on the etched foil surface and on the pit inner wall formed by the first half wave $W_1$ and, at the time of enlargement of the pits by the second half wave $W_2$, weak parts of the foil surface and the pit inner wall are repaired. Therefore, the rest period between the two half waves brings about the enlargement of pits with good efficiency.

Further, the electric current applied during this rest period is preferably 0. If an electric current that is over $1/15$ of the maximum amplitude during a half period on the positive side or the negative side is applied, the etching efficiency is lowered. From this the effect of the provision of the rest period can be understood.

Further, when the ratio $t_1/t_2$ of the applied time $t_1$ of the first half wave to the applied time $t_2$ of the second half wave is greater than 3.0, or smaller than 0.5, the etching efficiency is lowered. This shows that, in order to allow the start and extension of pits by the first $W_1$ and the enlargement of pits by the second half wave $W_2$ to take place effectively, the ratio of the applied time of the first half wave to the applied time of the second half wave has an optimum value.

According to the present invention, as an etching power supply, alternating current is used which comprises two half waves in the half period and a rest period between the two half waves on the positive side or the negative side during which a microcurrent whose amplitude is 0 or at most $\frac{1}{15}$ of the maximum amplitude during a half period is applied. By this, a foil high in etching efficiency can be produced and the effective surface gain can be increased without lowering the mechanical strength. Two half waves are provided in a half period and the pit formation process of one cycle of alternating current is divided into a first stage and a second stage thereby improving the etching efficiency. Accordingly, it is not required to divide the etching facilities into two and therefore the present invention is suitable for rationalization of production facilities. The foil produced by the present invention can be used as a cathode foil and an anode foil for low voltage that can contribute to make the size of electrolytic capacitors small.

BRIEF DESCRIPTION OF THE DRAWINGS

FIG. 1A is a diagram showing the waveform of alternating current of Example 1.

FIG. 1B is a diagram showing the waveform of alternating current of Example 2.

DESCRIPTION OF THE PREFERRED EXAMPLES

Figure 1C:
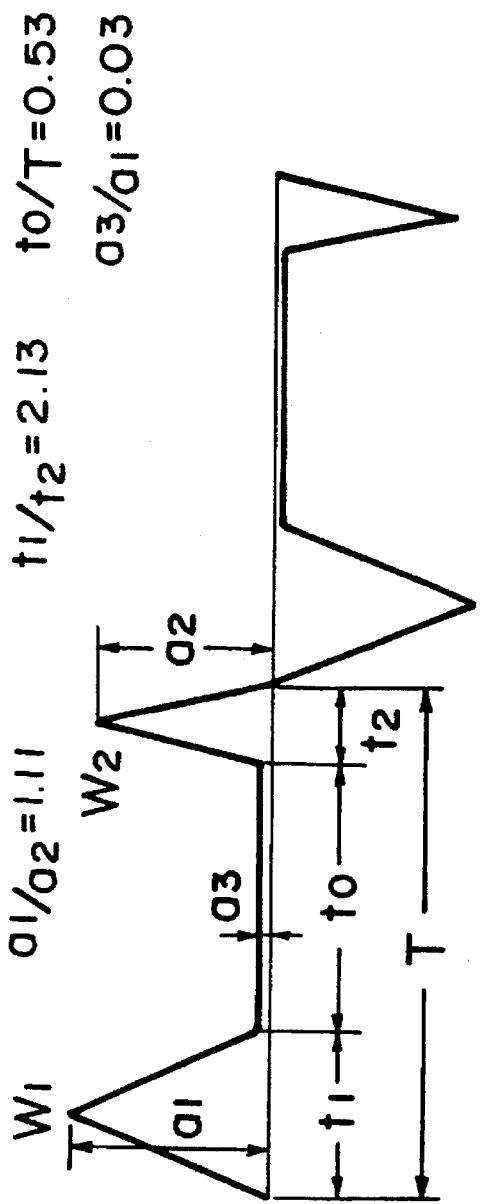
FIG. 1C is a diagram showing the waveform of alternating current of Example 3.
Figure 1D:
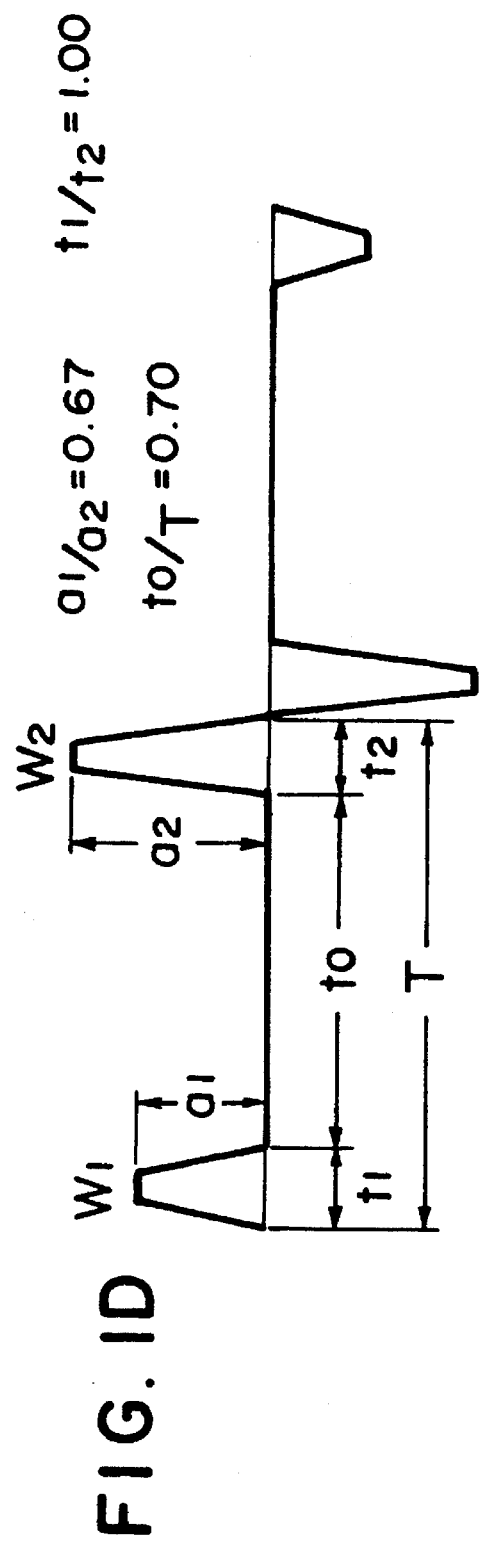
FIG. 1D is a diagram showing the waveform of alternating current of Example 4.

FIGS. 1A to 1D show alternating currents used in Examples of the present invention, wherein $W_1$ indicates a first half wave, $W_2$ indicates a second half wave, $a_1$ indicates the amplitude of the first half wave, $a_2$ indicates the amplitude of the second half wave, $a_3$ indicates the amplitude of a rest period, $t_0$ indicates the time of the rest period between the two half waves, T indicates the time of the half period, $t_1$ indicates the applied time of the first half wave, and $t_2$ indicates the applied time of the second half wave; FIG. 1A shows a case wherein alternating current has a triangular wave, and $a_1/a_2=3.45$, $t_1/t_2=2.67$, and $t_0/T=0.45$; FIG. 1B shows a case wherein alternating current has a sine wave, and $a_1/a_2=2.00$, $a_3/a_1=0.025$, $t_1/t_2=1.40$, and $t_0/T=0.40$; FIG. 1C shows a case wherein alternating current has a triangular wave, and $a_1/a_2=1.11$, $a_3/a_1=0.03$, $t_1/t_2=2.13$, and $t_0/T=0.53$; and FIG. 1D shows a case wherein alternating current has a trapezoidal wave, and $a_1/a_2=0.67$, $t_1/t_2=1.00$, and $t_0/T=0.70$.

Now the present invention will be described specifically by reference to the following Examples and Comparative Examples.

EXAMPLE 1

A soft material of aluminum foil having a purity of 99.86% and a thickness of 50 μm was etched at 45° C. in an electrolytic solution containing 4.5% by weight of hydrochloric acid, 0.9% by weight of phosphoric acid, and 2.0 % by weight of aluminum chloride. The alternating current used had the waveform shown in FIG. 1A with $a_1/a_2=3.45$, $t_1/t_2=2.67$, and $t_0/T=0.45$, the frequency being 15.0 Hz, and the current density (the ratio of the effective value to the projected area) being 280 mA/cm$^2$.

Then after the etched foil was washed with pure water, it was subjected to usual 3 V formation in an aqueous ammonium adipate solution, and the capacitance was measured.

COMPARATIVE EXAMPLE 1

The same aluminum foil and electrolytic solution as those used in Example 1 were used, then etching was carried out at 45° C. by using alternating current having a single triangular wave with the frequency being 33.0 Hz and the current density being 280 mA/cm$^2$, the same formation as that in Example 1 was carried out, and the capacitance was measured.

Figure 2:
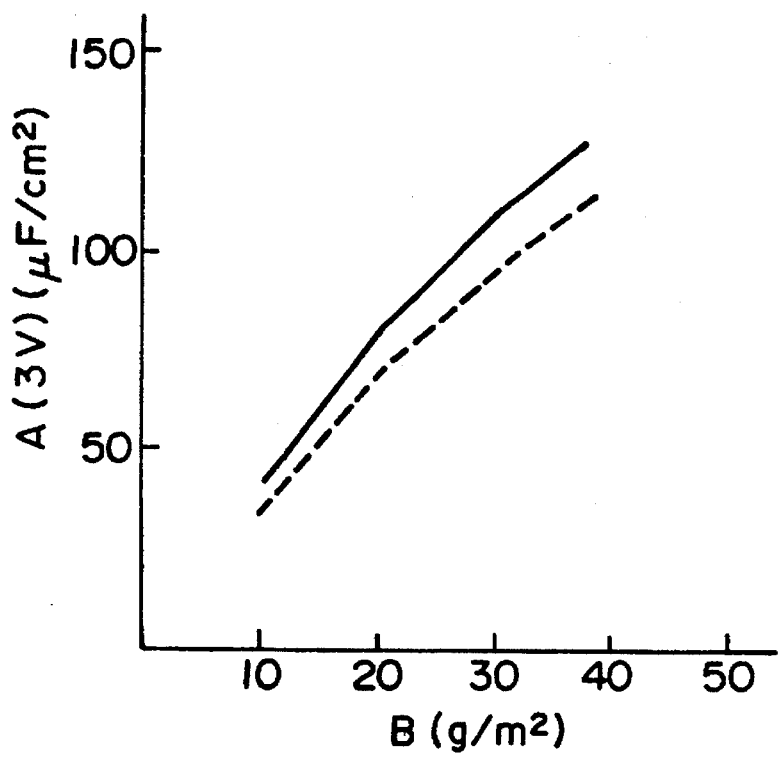
FIG. 2 is a graph of the etching efficiencies of etched foils at 3 V formed foil capacitance obtained in Example 1 and Comparative Example 1.

FIG. 2 is a graph of the etching efficiencies of etched foils at 3 V formed foil capacitance obtained in Example 1 and Comparative Example 1, wherein the 3 V formed foil capacitance A (μF/cm$^2$) is plotted as the ordinate and the etching weight loss B (g/m$^2$) is plotted as abscissa. The solid line indicates Example 1 and the broken line indicates Comparative Example 1. Referring to FIG. 2, the comparison of the etching efficiencies at the same etching weight loss indicates that the capacitance of Example 1 is higher than that of Comparative Example 1, and for example at an etching weight loss of 30 g/m$^2$ the capacitance of Comparative Example 1 is 98 μF/cm$^2$ whereas the capacitance of Example 1 is 113 μF/cm$^2$.

EXAMPLE 2

A soft material of aluminum foil having a purity of 99.98% and a thickness of 100 μm was etched at 18° C. in an electrolytic solution containing 4.0% by weight of hydrochloric acid, 1.5% by weight of phosphoric acid, 0.6% by weight of nitric acid, and 4.2% by weight of aluminum chloride. The alternating current used had the waveform shown in FIG. 1B with $a_1/a_2=2.0$, $a_3/a_1=0.025$, $t_1/t_2=1.40$, and $t_0/T=0.40$, the frequency being 5 Hz, and the current density (the ratio of the effective value to the projected area) being 140 mA/cm$^2$. Then after the etching the etched foil was washed with pure water, and subjected to usual 20 V formation in an aqueous ammonium adipate solution.

COMPARATIVE EXAMPLE 2

The same aluminum foil and electrolytic solution as those used in Example 2 were used, then etching was carried out at 18° C. by using alternating current having a single sine wave with the frequency being 12.0 Hz and the current density (the ratio of the effective value to the projected area) being 140 mA/cm$^2$, and the same formation as that in Example 2 was carried out.

Figure 3:
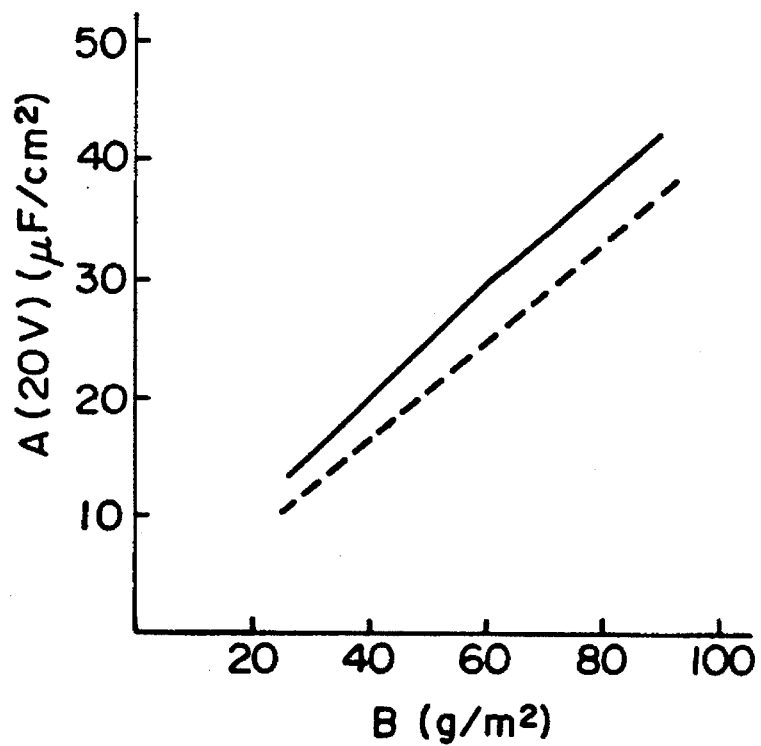
FIG. 3 is a graph of the etching efficiencies of etched foils at 20 V formed foil capacitance obtained in Example 2 and Comparative Example 2.

FIG. 3 is a graph of the etching efficiencies of etched foils at 20 V formed foil capacitance obtained in Example 2 and Comparative Example 2, with the 20 V formed foil capacitance A (μF/cm$^2$) being plotted as the ordinate and the etching weight loss B (g/m$^2$) being plotted as the abscissa. The solid line indicates Example and the broken line indicates Comparative Example. Referring to FIG. 3, the comparison of the etching efficiencies at the same etching weight loss indicates that the 20 V formed foil capacitance of Example 2 is higher than the capacitance of Comparative Example 2, and for example at an etching weight loss of 90 g/m² the capacitance of Comparative Example 2 is 38 μF/cm² whereas the capacitance of Example 2 is 42 μF/cm².

EXAMPLE 3

A soft material of aluminum foil having a purity of 99.98% and a thickness of 70 μm was etched at 35° C. in an electrolytic solution containing 4.5% by weight of hydrochloric acid, 0.9% by weight of oxalic acid, 0.5% by weight of nitric acid, and 2.0% by weight of aluminum chloride. The alternating current used had the waveform shown in FIG. 1C with $a_1/a_2=1.11$, $a_3/a_1=0.03$, $t_1/t_2=2.13$, and $t_0/T=0.53$, the frequency being 10.5 Hz, and the current density (the ratio of the effective value to the projected area) being 276 mA/cm². Then after the etching the etched foil was washed with pure water, and subjected to usual 40 V formation in an aqueous ammonium adipate solution.

COMPARATIVE EXAMPLE 3

The same aluminum foil and electrolytic solution as those used in Example 3 were used, then etching was carried out at 35° C. by using alternating current having a single triangular wave with the frequency being 24 Hz and the current density (the ratio of the effective value to the projected area) being 276 mA/cm², and the same formation as that in Example 3 was carried out.

Figure 4:
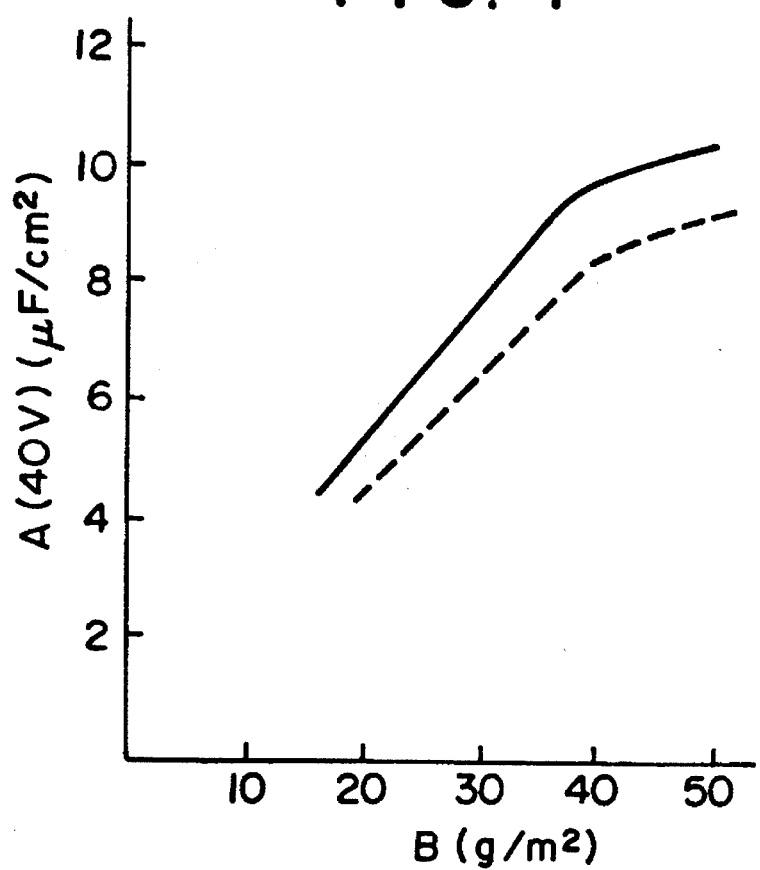
FIG. 4 is a graph of the etching efficiencies of etched foils at 40 V formed foil capacitance obtained in Example 3 and Comparative Example 3.

FIG. 4 is a graph of the etching efficiencies of etched foils at 40 V formed foil capacitance obtained in Example 3 and Comparative Example 3, with the 40 V formed foil capacitance A (μF/cm²) being plotted as the ordinate and the etching weight loss B (g/m²) being plotted as the abscissa. The solid line indicates Example and the broken line indicates Comparative Example. Referring to FIG. 4, the comparison of the etching efficiencies at the same etching weight loss indicates that the 40 V formed foil capacitance of Example 3 is higher than the capacitance of Comparative Example 3, and at an etching weight loss of 50 g/m² the capacitance of Example 3 is 10.3 μF/cm² that is higher than 9.0 μF/cm² of Comparative Example 3.

EXAMPLE 4

A soft material of aluminum foil having a purity of 99.98% and a thickness of 80 μm was etched at 25° C. in an electrolytic solution containing 9.0% by weight of hydrochloric acid, 0.45% by weight of oxalic acid, 0.08% by weight of sulfuric acid, and 2.0% by weight of aluminum chloride. The alternating current used had the waveform shown in FIG. 1D with $a_1/a_2=0.67$, $t_1/t_2=1.0$, and $t_0/T=0.7$, the frequency being 7.0 Hz, and the current density (the ratio of the effective value to the projected area) being 270 mA/cm². Then after the etching the etched foil was washed with pure water, and subjected to usual 80 V formation in an aqueous ammonium adipate solution.

COMPARATIVE EXAMPLE 4

The same aluminum foil and electrolytic solution as those used in Example 4 were used, then etching was carried out at 25° C. by using alternating current having a single trapezoidal wave with the frequency being 10.5 Hz and the current density (the ratio of the effective value to the projected area) being 132 mA/cm², and the same formation as that in Example 4 was carried out.

Figure 5:
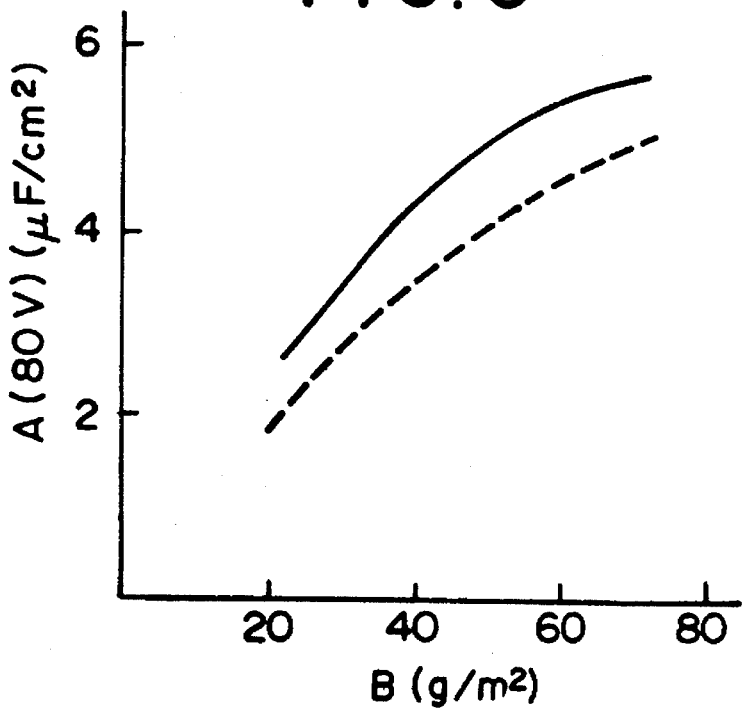
FIG. 5 is a graph of the etching efficiencies of etched foils at 80 V formed foil capacitance obtained in Example 4 and Comparative Example 4.

FIG. 5 is a graph of the etching efficiencies of etched foils at 80 V formed foil capacitance obtained in Example 4 and Comparative Example 4, with the 80 V formed foil capacitance A (μF/cm²) being plotted as the ordinate and the etching weight loss B (g/m²) being plotted as the abscissa. The solid line indicates Example and the broken line indicates Comparative Example. Referring to FIG. 4, the comparison of the etching efficiencies at the same etching weight loss indicates that the 80 V formed foil capacitance of Example 4 is higher than the capacitance of Comparative Example 4, and at an etching weight loss of 70 g/m² the capacitance of Example 4 is 5.7 μF/cm² that is higher than 5.0 μF/cm² of Comparative Example 3 by 14%.

The results of the measurement of the bending strength and the tensile strength of the foils etched in Examples 1, 2, 3, and 4 and Comparative Examples 1, 2, 3, and 4 are shown in Table 1. Herein, in addition to the alternating current waveforms shown in Examples 1, 2, 3, and 4, square waves and distorted waves also resulted in the same effect and combinations of waveforms whose first half wave $W_1$ and the second half wave $W_2$ are different in waveform also resulted in the same effect.

As is apparent from Table 1, according to the present etching method, even if the etching weight loss is the same and the mechanical strength is similar, foils high in capacitance can be produced.

Further, in the above Examples, when the electrolytic solution temperature is lower than 5° C. or higher than 50° C., or the frequency is lower than 1.0 Hz or higher than 30 Hz, or the current density (the ratio of the effective value to the projected area) is lower than 25 mA/cm² or higher than 450 mA/cm², the increase in the capacitance resulting from an increase in etching weight loss is lowered and the etching efficiency is lowered, so that the effect of the present invention is not observed.

TABLE 1

|  | Weight Loss (g/m²) | Capacitance (μF/cm²) | | | | Mechanical strength | |
|---|---|---|---|---|---|---|---|
|  |  | 3 V | 20 V | 40 V | 80 V | Bending strength (times/cm) | Tensile strength (kg/cm) |
| Example 1 | 30 | 113 |  |  |  | 135 | 2.18 |
| Comparative Example 1 | 30 | 98 |  |  |  | 140 | 2.20 |
| Example 2 | 90 |  | 42 |  |  | 130 | 2.98 |
| Comparative | 90 |  | 38 |  |  | 128 | 2.95 |

TABLE 1-continued

| | Weight Loss (g/m$^2$) | Capacitance (μF/cm$^2$) | | | | Mechanical strength | |
| --- | --- | --- | --- | --- | --- | --- | --- |
| | | 3 V | 20 V | 40 V | 80 V | Bending strength (times/cm) | Tensile strength (kg/cm) |
| Example 2 | | | | | | | |
| Example 3 | 50 | | | 10.3 | | 140 | 2.93 |
| Comparative Example 3 | 50 | | | 9.0 | | 142 | 2.95 |
| Example 4 | 70 | | | | 5.7 | 115 | 2.40 |
| Comparative Example 4 | 70 | | | | 5.0 | 122 | 2.28 |

What is claimed is:

1. In a method of etching aluminum foil for electrolytic capacitors by applying alternating current to the aluminum foil in an electrolytic solution containing chloride ions, the improvement comprising the steps of:

forming two half waves during the positive side half period and the negative side half period of said alternating current with at least one of the waveforms, the amplitudes and the applied times of the two half waves being the same in which the two half waves during the half period of said alternating current are any of sine waves, triangular waves, trapezoidal waves, square waves, or distorted waves and a ratio of the amplitude of the first half wave to the amplitude of the second half wave is in the range of 0.4 to 4.0, and forming a rest period between the half waves during the positive side half period and the negative side half period of said alternating current with an amplitude thereof being less than or equal to a microcurrent being applied at at most 1/15 of a maximum amplitude of the respective half wave during a half period.

2. The method of etching aluminum foil for electrolytic capacitors as claimed in claim 1, wherein the ratio of the applied time of the first half wave to the applied time of the second half wave, during the half period of said alternating current is in the range of 0.5 to 3.0.

3. The method of etching aluminum foil for electrolytic capacitors as claimed in claim 2, wherein the ratio of the time of the rest period to the time of the half period is in the range of 0.18 to 0.85.

4. The method of etching aluminum foil for electrolytic capacitors as claimed in claim 3, wherein said electrolytic solution comprises an aqueous solution including, as a major component, chloride ions, and any of phosphate ions, sulfate ions, nitric ions, oxalate ions, and the like or a combination of these, and alternating current with the frequency in the range of 1.0 Hz to 30 Hz and a current density in the range of 25 mA/cm$^2$ to 450 mA/cm$^2$ is applied to the aluminum foil in the electrolytic solution at a temperature in the range of 5° C. to 50° C.

5. In a method of etching aluminum foil for electrolytic capacitors by applying alternating current to the aluminum foil in an electrolytic solution containing chloride ions, the improvement comprising the steps of:

forming two half waves during the positive side half period and the negative side half period of said alternating current with at least one of the waveforms, the amplitude and the applied time of one of the half waves being different from the waveform, the amplitude, and the applied time of the other half wave, in which the two half waves during the half period of said alternating current are any of sine waves, triangular waves, trapezoidal waves, square waves, or distorted waves and the ratio of the amplitude of the first half wave to the amplitude of the second half wave is in the range of 0.4 to 4.0, and forming a rest period between the half waves with an amplitude thereof being less than or equal to a microcurrent being applied at at most 1/15 of a maximum amplitude of the respective half wave during a half period.

6. The method of etching aluminum foil for electrolytic capacitors as claimed in claim 5, wherein the ratio of the applied time of the first half wave to the applied time of the second half wave, during the half period of said alternating current is in the range of 0.5 to 3.0.

7. The method of etching aluminum foil for electrolytic capacitors as claimed in claim 6, wherein the ratio of the time of the rest period to the time of the half period is in the range of 0.18 to 0.85.

8. The method of etching aluminum foil for electrolytic capacitors as claimed in claim 7, wherein said electrolytic solution comprises an aqueous solution including, as a major component, chloride ions, and any of phosphate ions, sulfate ions, nitric ions, oxalate ions, and the like or a combination of these, and alternating current with the frequency in the range of 1.0 Hz to 30 Hz and a current density in the range of 25 mA/cm$^2$ to 450 mA/cm$^2$ is applied to the aluminum foil in the electrolytic solution at a temperature in the range of 5° C. to 50° C.

* * * * *